(12) United States Patent
Gibson

(10) Patent No.: US 7,706,387 B1
(45) Date of Patent: Apr. 27, 2010

(54) SYSTEM AND METHOD FOR ROUND ROBIN ARBITRATION

(75) Inventor: David Gibson, Suwanee, GA (US)

(73) Assignee: Integrated Device Technology, Inc., San Jose, CA (US)

( * ) Notice: Subject to any disclaimer, the term of this patent is extended or adjusted under 35 U.S.C. 154(b) by 634 days.

(21) Appl. No.: 11/421,415

(22) Filed: May 31, 2006

(51) Int. Cl.
H04L 12/28 (2006.01)

(52) U.S. Cl. .................................. 370/395.42
(58) Field of Classification Search ................. 370/389, 370/395.42, 414, 416, 429; 710/40, 41, 111, 710/116, 120, 244
See application file for complete search history.

(56) References Cited

U.S. PATENT DOCUMENTS

| | | | |
|---|---|---|---|
| 4,473,880 A | 9/1984 | Budde et al. |
| 4,932,028 A | 6/1990 | Katircioglu et al. |
| 4,987,529 A | 1/1991 | Craft et al. |
| 4,991,171 A | 2/1991 | Teraslinna |
| 5,072,363 A | 12/1991 | Gallagher |
| 5,229,991 A | 7/1993 | Turner |
| 5,276,684 A | 1/1994 | Pearson |
| 5,305,311 A | 4/1994 | Lyles |
| 5,440,546 A | 8/1995 | Bianchini, Jr. |
| 5,710,549 A | 1/1998 | Horst et al. |
| 5,764,927 A | 6/1998 | Murphy et al. |
| 5,999,981 A | 12/1999 | Willenz |
| 6,044,085 A | 3/2000 | Horlander |
| 6,098,110 A | 8/2000 | Witkowski |
| 6,134,229 A | 10/2000 | Schwaller et al. |
| 6,377,782 B1 | 4/2002 | Bishop et al. |
| 6,389,479 B1 | 5/2002 | Boucher et al. |
| 6,598,179 B1 | 7/2003 | Chirashnya et al. |
| 6,625,121 B1 | 9/2003 | Lau et al. |
| 6,633,578 B1 | 10/2003 | Matsumaru et al. |
| 6,647,449 B1 | 11/2003 | Watts |
| 6,661,788 B2 | 12/2003 | Angle et al. |
| 6,662,339 B1 | 12/2003 | Lanemann et al. |
| 6,675,325 B1 | 1/2004 | Garney et al. |
| 6,678,279 B1 | 1/2004 | Meredith |

(Continued)

FOREIGN PATENT DOCUMENTS

WO 0239667 5/2002

OTHER PUBLICATIONS

RapidIO: An Embedded System Component Network Architecture, Feb. 22, 2000, Motorola.

(Continued)

*Primary Examiner*—Chirag G Shah
*Assistant Examiner*—Yong Zhou
(74) *Attorney, Agent, or Firm*—Molly Sauter; Kenneth Glass; Glass & Associates

(57) ABSTRACT

A switch includes an arbiter that receives a plurality of requests from N input ports, and determines N round robin arbitration option winners by performing N round robin arbitration options on the requests, each of the N round robin arbitration options performed assuming that a different one of the N input ports was a previous round robin arbitration winner. After the actual previous round robin arbitration winner is identified, a current round robin arbitration winner from among the N round robin arbitration option winners is determined by selecting the round robin arbitration option winner in which the assumed previous round robin arbitration winner is the actual previous round robin arbitration winner.

32 Claims, 4 Drawing Sheets

U.S. PATENT DOCUMENTS

| | | |
|---|---|---|
| 6,804,237 B1 | 10/2004 | Luo |
| 6,882,649 B1 | 4/2005 | Gura et al. |
| 6,937,133 B2 | 8/2005 | Johnson et al. |
| 6,954,463 B1 | 10/2005 | Ma et al. |
| 6,954,811 B2 | 10/2005 | Vishnu |
| 6,954,812 B2 | 10/2005 | Lavigne |
| 6,963,576 B1 | 11/2005 | Lee |
| 6,975,651 B1 | 12/2005 | Ono et al. |
| 6,988,177 B2 | 1/2006 | Sokol |
| 7,006,501 B1 | 2/2006 | Gura et al. |
| 7,020,161 B1 | 3/2006 | Eberle et al. |
| 7,023,840 B2 | 4/2006 | Golla et al. |
| 7,027,443 B2 | 4/2006 | Nichols |
| 7,058,789 B2 | 6/2006 | Henderson et al. |
| 7,106,742 B1 | 9/2006 | Frisch et al. |
| 7,224,671 B2 | 5/2007 | Lee et al. |
| 7,260,120 B2 | 8/2007 | Kang et al. |
| 7,274,705 B2 | 9/2007 | Chang et al. |
| 2001/0014105 A1 | 8/2001 | Tezuka et al. |
| 2001/0020266 A1 | 9/2001 | Kojima et al. |
| 2002/0085550 A1 | 7/2002 | Rhodes |
| 2002/0141256 A1 | 10/2002 | Barri et al. |
| 2003/0110206 A1 | 6/2003 | Osokine |
| 2003/0147394 A1 | 7/2003 | Jennings et al. |
| 2004/0114587 A1 | 6/2004 | Huang et al. |
| 2004/0153835 A1 | 8/2004 | Song et al. |
| 2004/0179535 A1* | 9/2004 | Bertagna ............... 370/395.21 |
| 2004/0184466 A1 | 9/2004 | Chang et al. |
| 2004/0258086 A1* | 12/2004 | Kurupati ................. 370/447 |
| 2005/0058127 A1 | 3/2005 | Munter et al. |
| 2005/0111434 A1 | 5/2005 | Halen |
| 2005/0138055 A1 | 6/2005 | Handlogten |
| 2005/0232201 A1 | 10/2005 | Bysted et al. |
| 2005/0249244 A1 | 11/2005 | McNamara et al. |
| 2006/0007885 A1 | 1/2006 | Pollak et al. |
| 2006/0050738 A1 | 3/2006 | Carr et al. |
| 2006/0075311 A1 | 4/2006 | Ranjan et al. |
| 2006/0128436 A1 | 6/2006 | Doi et al. |
| 2006/0248377 A1 | 11/2006 | Tezcan et al. |
| 2006/0251069 A1 | 11/2006 | Cathey et al. |
| 2007/0072646 A1 | 3/2007 | Kuwahara et al. |
| 2007/0124554 A1 | 5/2007 | Allen et al. |
| 2007/0242599 A1 | 10/2007 | Gorday et al. |
| 2008/0219235 A1 | 9/2008 | Ma et al. |
| 2008/0228871 A1 | 9/2008 | Sano |
| 2008/0275872 A1 | 11/2008 | Venkatachary et al. |
| 2008/0298492 A1 | 12/2008 | Hwang et al. |

OTHER PUBLICATIONS

RFC: 791, DARPA Internet Program Protocol Specification, Sep. 1981, Information Science Institute.

802.11 standard, Aug. 21, 2002, http://wlan.nat.sdu.dk/802_11standard.htm.

History of the I2C Bus, Circa 2000, ESAcademy, 2000.

International Search Report, PCT/US2006/013767, Jul. 31, 2006.

"Tsi568A: Serial RapidIO Switch," Tundra Semiconductor Corp., Printed From Internet Feb. 17, 2005, 4 pages.

"RapidIO: An Embedded System Component Network Architecture," Architecture and Systems Platforms, Motorola Semiconductor Product Sector, Feb. 22, 2000, 25 pages.

Bertan Tezcan and Bill Beane, "How to achieve low-cost, reusable wireless infrastructure through modular baseband design," Wireless Net DesignLine, Aug. 8, 2006, available at http://www.wirelessnetdesignline.com.

Bertan Tezcan and Bill Beane, "Achieving modular wireless infrastructure design: A compelling look at benefits supporting connectivity amongst DSPs, FPGAs, or ASICs," OpenSystems Publishing, Sep. 22, 2006, available at http://www.dsp-fpga.com/articles/tezcan_and_beane.

Bertan Tezcan and Bill Beane, "Modular baseband design—Enabling a low-cost reusable wireless infrastructure(Part I)," Portable Design Online Article, Feb. 15, 2007, previously available at http://pd.pennnet.com.

Bertan Tezcan and Bill Beane, "Modular baseband design—Enabling a low-cost reusable wireless infrastructure(Part II)," Portable Design Online Article, Feb. 15, 2007, previously available at http://pd.pennnet.com.

Lukas Sekanina and Vladimir Drabek, "Theory and Applications of Evolvable Embedded Systems," Proceedings of the 11th IEEE International Conference and Workshop on the Engineering of Computer-Based Systems (ECBS'04), 2004.

"Cisco MDS 9020 Fabric Switch Configuration Guide and Command Reference, Release 2.x," pp. 10-1 through 10-4, Cisco Systems, Inc., Jun. 2005.

Peter J. Welcher, "Configuring SNMP on Switches, and Syslog," Jun. 24, 1999.

"RapidIO Interconnect Specification, Part 8, Error Management, Extensions Specification," RapidIO Trade Association, Jun. 2005.

* cited by examiner

SYSTEM AND METHOD FOR ROUND ROBIN ARBITRATION

CROSS REFERENCE TO RELATED APPLICATION

The present application is related to co-pending U.S. patent application Ser. No. 11/383,165, filed May 12, 2006, entitled "Packet Processing in a Packet Switch with Improved Output Data Distribution," which is incorporated herein by reference in its entirety.

BACKGROUND OF THE INVENTION

Modern telecommunication networks include switching networks for transmitting data from a source device to a destination device. Circuit switching and packet switching are commonly used in high-capacity networks. In circuit-switched networks, network resources are established from the sender to receiver before the start of the transfer of the data. The resources remain dedicated to the circuit during the transfer of the data and all of the data follows the same path. By contrast, in packet-switched networks, the data is broken into packets, each of which can take a different route to the destination where the packets are recompiled into the original message.

In packet switching networks the data to be transmitted is split up and encapsulated into data packets along with a destination address of the data. The packet switching network individually routes each data packet through a network of interconnected packet switches based on the destination address in the data packet. The data packets may be routed through different paths in the packet switching network and generally arrive at the destination device in an arbitrary order. At the destination device, the data is reconstructed from the data packets.

Because the packet switch may receive multiple data packets at the input ports that are destined for the same output port, the packet switch often includes an arbiter that determines an order for routing data packets through the packet switch. The input ports of the packet switch issue grant requests to the arbiter for routing data contained in data packets to the output ports. The arbiter then determines whether the output port identified by each grant request is available to receive data. If an output port identified by a grant request is available to receive data, the arbiter selects a grant request that identifies the output port and issues a grant to the input port that issued the selected grant request. The packet switch then routes data contained in a data packet of each input port that received a grant to the output port identified by the selected grant request issued by the input port.

In determining which input port should be granted access, the arbiter commonly performs a form of round robin arbitration to ensure that all the input ports requesting access to the output ports have equal access time. Round robin arbitration is a method of choosing all elements in a list, set, or group equally in some rational order, usually from the top to the bottom of a list and then starting again at the top of the list. Typical round robin arbitration involves assigning priorities according to a predetermined order among the input ports. As message traffic is received, the priorities change so that the last input granted access to a particular output is then given the lowest priority, and the next input in order of priority now has the highest priority. The remaining input ports will have their priorities similarly changed according to the predetermined order.

Round robin algorithms are commonly used for round robin arbitration to select from one among a number of candidates, while insuring that each candidate is treated fairly. In the implementation of a packet switch, the candidates are the input ports. In a round robin algorithm for N candidates, the candidates are typically arranged in a vector such that candidate 1 populates bit 1, candidate 2 populates bit 2, and so on, to create an N bit bus. If candidate A is the winner in the current round, then candidate A+1 has the highest priority in the next round, if A<N, while candidate 1 has the highest priority in the next round if A=N. As such, the candidate from the previous selection always has the lowest priority and N always has a higher priority than 1, unless the previous selection was N.

A typical implementation of the round robin algorithm involves two steps. First, the candidate vector is shifted or rotated so that its bits are organized with the highest priority candidate in bit position 1 according to the algorithm, with the priority successively decreasing until the lowest priority bit is in position N. Then, the lowest bit index with an active candidate is selected as the winning candidate. There is an inherent delay associated with waiting for the candidate vector to be rotated prior to making the winning selection in a round robin arbitration algorithm. The delay resulting from the round robin arbitration ultimately affects the performance of the switch. Accordingly, it is advantageous to reduce this delay as much as possible.

Additionally, some applications of the round robin algorithm require evaluating the acceptability of candidates prior to performing a round robin selection. Typically, this requires testing some attribute of the candidate, accepting all candidates that possess this attribute, and then submitting the accepted candidates to the round robin process. As such, selection of the accepted candidates must be delayed until the attribute on which the selection is based becomes available. This delay also affects the performance of the switch and should be reduced as much as possible.

In light of the above, a need exists for reducing the time required for an arbiter to select data for routing through a switch. A further need exists for reducing the time required for an arbiter to perform a round robin arbitration to select a winning candidate.

SUMMARY OF THE INVENTION

A method for arbitration in a switch, in accordance with one embodiment, includes receiving a plurality of requests from N input ports. N round robin arbitration option winners are then determined by performing N round robin arbitration options on the requests. Each of the N round robin arbitration options is performed assuming that a different one of the N input ports was a previous round robin arbitration winner. The input port of the N input ports that was the actual previous round robin arbitration winner is then identified and the current round robin arbitration winner is selected from among the N round robin arbitration option winners by selecting the round robin arbitration option winner in which the assumed previous round robin arbitration winner is the actual previous round robin arbitration winner.

In a particular embodiment, the N round robin arbitration options are performed substantially simultaneously.

Additionally, the plurality of requests may also include a priority signal. This priority signal affects the selection process of the arbiter such that requests having a higher priority are selected over requests of a lower priority. To accommodate for this priority signal, or other selection criteria of the switch, the method further includes identifying each of the N requests as belonging to one of P priority groups prior to the step of determining N round robin arbitration option winners. N*P round robin arbitration options are then performed, where N round robin arbitration options are performed within each of the P priority groups recognizing a different P priority group as being a possible desired priority group. From among the N*P round robin arbitration option winners, P round robin arbitration priority group winners are determined. The P round robin arbitration priority group winners are then determined by selecting the round robin arbitration option winner within each of the P priority groups in which the assumed previous round robin arbitration winner is the actual previous round robin arbitration winner. After a desired priority group has been identified, the current round robin arbitration winner is selected from the P round robin arbitration priority group winners by selecting the round robin arbitration priority group winner identified by the desired priority group.

In a specific embodiment, the plurality of requests are received from N input ports as an N bit vector and for each of the N round robin arbitration options, the bit positions of the N bit vector are hard wired to identify one of the N input ports as being the assumed previous round robin arbitration winner. The round robin arbitration option winner for each of the N round robin arbitration options is then the input port identified by the least significant bit of the N bit vector having an active request.

A system for round robin arbitration in a switch in accordance with one embodiment, includes an arbiter having N rotate and select option modules configured to determine N round robin arbitration option winners by performing N round robin arbitration options on the requests received from the input ports, each of the N round robin arbitration options performed assuming that a different one of the N input ports was a previous round robin arbitration winner. The arbiter includes logic to identify the input port of the N input ports that was the actual previous round robin arbitration winner and a rotate and select module configured to the rotate and select option modules to select a current round robin arbitration winner from among the N round robin arbitration option winners by selecting the round robin arbitration option winner in which the assumed previous round robin arbitration winner is the actual previous round robin arbitration winner.

In a specific embodiment, the N rotate and select modules of the arbiter perform the N round robin arbitration options substantially simultaneously.

In an additional embodiment, the arbiter includes a priority module to identify each of the requests as belonging to one of P priority groups and N*P rotate and select option modules to determine N*P round robin arbitration options, wherein N round robin arbitration options are performed within each of the P priority groups recognizing a different P priority group of requests as being a possible desired priority group. The N*P rotate and select option modules are coupled to P rotate and select modules to select P round robin arbitration priority group winners from among the N*P round robin arbitration option winners by selecting the round robin arbitration option winner within each of the P priority groups in which the assumed previous round robin arbitration winner is the actual previous round robin arbitration winner. After a desired priority group is identified, a rotate and select priority module of the arbiter is used to select the current round robin arbitration winner from the P round robin arbitration priority group winners by selecting the round robin arbitration priority group winner identified by the desired priority group.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

Figure 1:
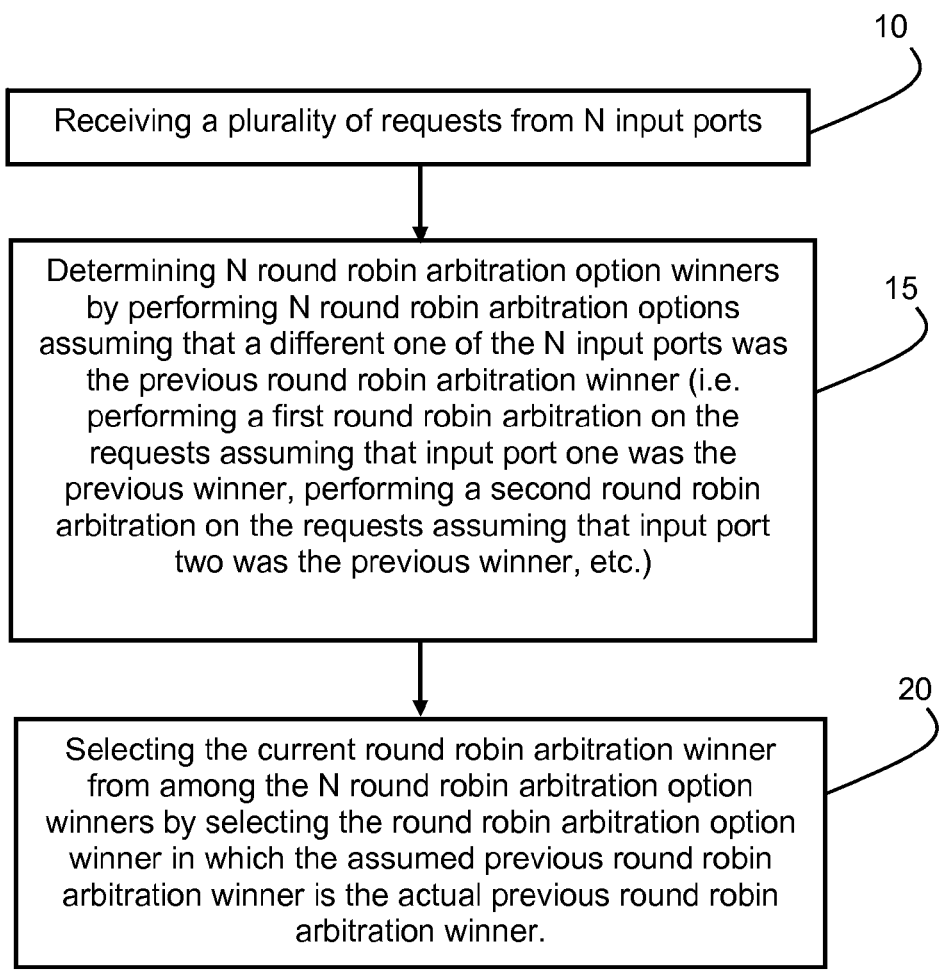
FIG. 1 is a flow diagram illustrating a method for arbitration in a switch, in accordance with an embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

In accordance with one embodiment of the present invention, a packet switch routes packets from input ports to output ports without modifying them. Typically, input ports for the switch are driven by receive ports of the device, also called source ports. Likewise, output ports for the switch typically drive transmit ports of the device, also called destination ports. The switch is able to receive packet data at the input ports, buffering it until it can be transmitted through the switch. Also, it should be able to handle conditions when the buffer fills and when the element driving the input port aborts transfer of a packet after it has begun. The switch can arbitrate among the various input ports for access to the switch, insuring that the desired output port(s) is (are) ready to accept a packet of the given priority before it is submitted to the switch. In a specific embodiment, the switch arbitration also insures that the packet ordering requirements of the RapidIO specification are honored. In addition, the switch stores data at the output port until full packets have been accumulated. Packets are then transferred to the destination port when requested to do so by the destination port.

When a grant request is presented to the arbiter by an input port, the arbiter begins considering that input port for a grant. When a grant is issued to an input port, the arbiter is granting permission for that input port to access the switch for one clock cycle so that a single 32-bit word may be transmitted. Only one input port may receive a grant in a single cycle. If multiple input ports simultaneously request access to the switch, then only those input ports with the highest priority packet will be considered. If there is more than one input port with highest priority data requesting access to that switch, then the arbiter cycles through the requests in round robin fashion. When there are no more requests of that highest priority, the arbiter will drop down to the next highest priority with input port requests and perform a similar round robin. If higher priority requests reappear, then the serviced priority changes again to the new higher priority, so that on every cycle the arbiter is serving only those requests of the highest priority. Accordingly, words from packets with different priorities can be interleaved as they go through the switch if the higher priority packet's input port is waiting to receive additional words. This insures maximum utility of the switch, and consequently maximum throughput of data.

The time required for the arbiter to perform and round robin arbitration on the requests from the input ports results in a delay in the switch. A typical implementation of a round robin arbitration algorithm in a packet switch involves two steps. First, the candidate vector resulting from the input requests is shifted, or rotated, so that its bits are organized with the highest priority candidate bit in position 1, with the priority successively decreasing until the lowest priority bit is in position N. Then, the lowest bit index with an active candidate is selected. There is a significant delay associated with rotating candidates prior to making the winning selection.

The present invention utilizes multiple parallel instances of round robin selection hardware to improve the arbiter's overall round robin selection time. As such, the present invention eliminates the delay caused by rotating candidates and replaces the delay with the delay associated with selecting one from among a number of round robin winners, which is a much smaller delay.

With reference to FIG. 1, in accordance with an embodiment of the present invention, an arbiter of a packet switch receives a plurality of requests from N input ports 10. The request from the input port may be a grant request indicating that the port has data available for transfer. Multiple round robin arbitration options are then performed to determine N round robin arbitration winners. Each of the N round robin arbitration options is performed assuming that a different one of the N input ports was the previous round robin arbitration winner 15. For example, a first round robin arbitration is performed on the requests assuming that input port one was the previous winner, a second round robin arbitration is performed on the requests assuming that input port two was the previous winner, and continuing in this fashion until the N round robin arbitration option winners have been determined. After the actual previous round robin arbitration winner is identified, the current round robin arbitration winner is then selected from among the N round robin arbitration option winner by selecting the round robin arbitration option winner in which the assumed previous round robin arbitration winner is the actual previous round robin arbitration winner 20. In a particular implementation of the present invention, to perform each of the N round robin arbitration options, the bits of the N bit request vector are hardwired to be the assumed previous round robin arbitration winner.

As such, N round robin options are performed with each of the round robin options assuming that a different input port won the previous selection. This eliminates the need to do any rotation because each option is hardwired to place the requests in their proper relative position. The active candidate in the lowest bit index position in each of the options is then selected, giving a total of N option winners. Knowledge of the previous round robin winner is then used to determine which of these option winners should be selected. The option winner that is selected may then be issued a grant to access the switch and transfer data. Choosing option winners on the output side of the round robin is preferable to performing an ordering step on the input side, since generation of the one-hot selection of the desired option can be generated in parallel with the option winner selections. The one-hot selection is dependent upon the previous round robin arbitration winner and as such, the generation of the round robin option winners can begin before the previous round robin arbitration winner is determined.

In addition to the delay associated with rotating candidates in a round robin arbitration, there is also a delay caused by waiting for selection criteria. In particular, the selection criteria may be associated with the priority of the request. To eliminate this delay, the present invention performs a round robin on the candidates from each of the possible categories. When the desired category is determined, the appropriate round robin winner is selected. As such, determining which category's winner will be used can occur while the round robin process itself is proceeding. The round robin does not have to wait to start until the desired category is determined. This embodiment of the invention is shown with reference to FIG. 2 in which, the arbiter receives a plurality of requests from N input ports 10. The requests are identified as belonging to one of P priority groups 25. P round robin arbitration group winners are identified by performing P round robin arbitrations, wherein P round robin arbitrations are performed within each of the P priority groups recognizing a different P priority group as being a possible desired priority group 30. After the desired priority group has been identified 35, the current round robin arbitration winner is selected from the P round robin arbitration priority group winners by selecting the round robin arbitration priority group winner identified by the desired priority group 40.

Figure 2:
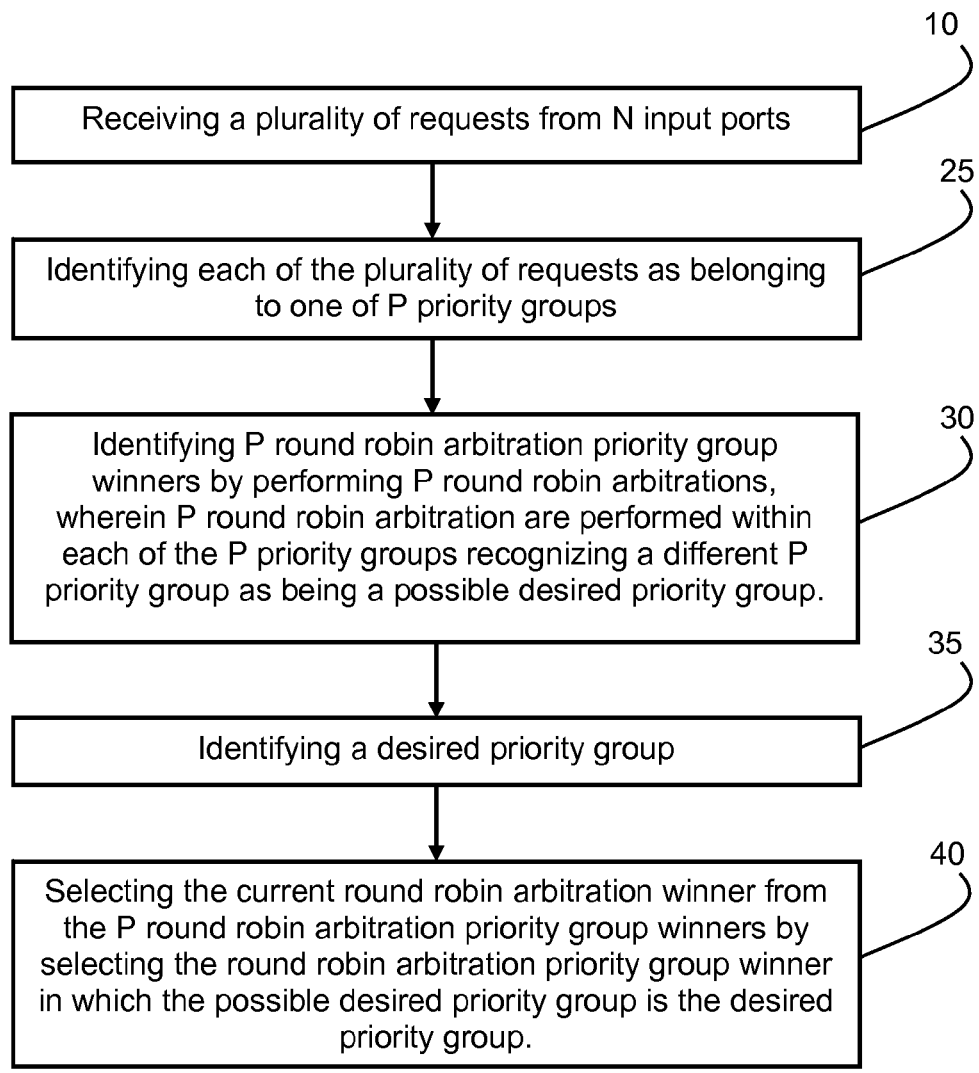
FIG. 2 is a flow diagram illustrating a method for arbitration in a switch, in accordance with an embodiment of the present invention.
Figure 3:
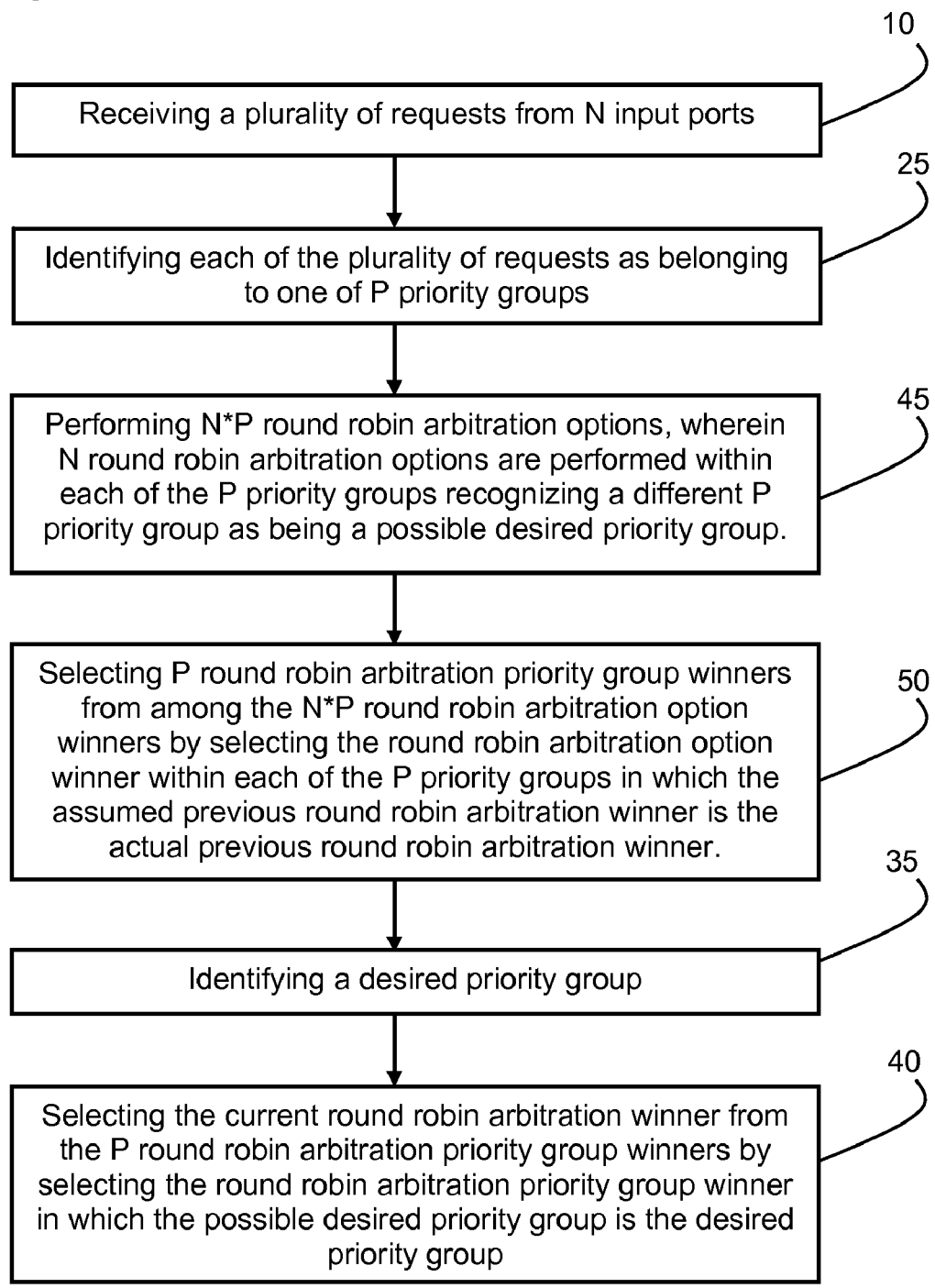
FIG. 3 is a flow diagram illustrating a method for arbitration in a switch, in accordance with an embodiment of the present invention.

The delay caused by pre-evaluating the requests based on selection criteria and the delay caused by dynamically rotating the candidates can be further reduced by combining the methods of FIG. 1 and FIG. 2. With reference to FIG. 3, an arbitration method in accordance with the present invention is illustrated in which, a plurality of requests from N input ports are received 10. The requests are identified as belonging to one of P priority groups 25. N*P round robin arbitration options are then performed, wherein N round robin arbitration options are performed within each of the P priority groups recognizing a different P priority group as being a possible desired priority group 45. P round robin arbitration priority group winners are selected from among the N*P round robin arbitration option winners by selecting the round robin arbitration option winner within each of the P priority groups in which the assumed previous round robin arbitration winner is the actual previous round robin arbitration winner 50. After a desired priority group has been identified 35, the current round robin arbitration winner is selected from the P round robin arbitration priority group winners by selecting the round robin arbitration priority group winner in which the possible desired priority group is the desired priority group 40. As such, the desired category can be determined while the round robin process itself is proceeding. The round robin does not have to wait to start until the desired priority group is determined.

In an exemplary embodiment of the present invention which eliminates the delay caused by waiting for the selection criteria and the delay associated with rotating the requests, in an N port priority sensitive switch with P priorities, N*P round robin options are generated. All the requests having a priority of A would be sent to the N priority A round robins, all priority B requests would be sent to the B round robins, etc. With this embodiment, it is not necessary to wait until it is determined whether the highest priority is A or B, since processing would commence immediately on both priority groups. When the desired priority group is finally identified, a candidate is immediately available. Additionally, no rotation is necessary for the generation of these round robin options according to the method of the present invention.

Figure 4:
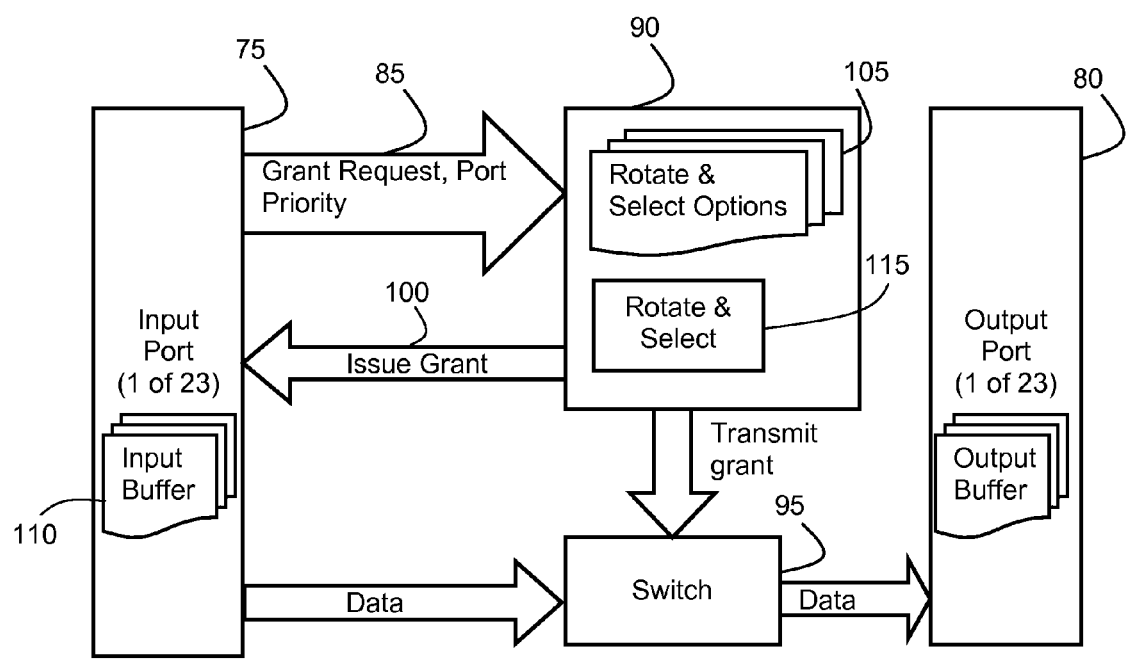
FIG. 4 is a block diagram of a switch including an arbitration system in accordance with the present invention.

With reference to FIG. 4, in another embodiment of the invention an arbiter 90 is responsible for collecting all the serviceable grant requests 85 from the input ports 75 and performing round robins on the serviceable grant requests to determine which one will be honored. The grant is then issued 100 to the winning input port and the data is transferred through the switch 95 to the appropriate output port 80. The round robin arbitration process is implemented in the rotate and select module 115 of the arbiter 90. The rotate and select module 115 is referred to as rotate and select because the process consists of 1) rotating the bits so that bit position 0 (i.e. least significant bit) has the highest priority, and then 2) selecting the least significant bit that is high to receive the grant. The least significant that is considered the bit of the highest priority will vary depending on the previous round robin selection.

In an exemplary embodiment for a switch having 23 input ports 75 and 23 output ports 80, each round robin has a maximum of 23 potential requests to arbitrate—one from each of the 23 input buffers 75. The input buffers 110 of the switch are responsible for receiving data entering the switch, buffering it, and controlling its exposure to the central arbiter 90. While the input buffer 110 receives the data from the input port 75, the two terms are used interchangeably throughout the description of the present invention and intended to identify an input to the switch in general. Each input buffer 110 is assigned a number from 0 to 22. If the previous round robin winner was from input buffer N, then the next winner should be the request with the smallest input buffer number greater than N. If no requests come from input buffers greater than N, then the smallest input buffer with a request will win. It is important that this process be completed in a minimum number of cycles, since adding latency to this process will increase the length of the input buffer pipeline. In turn, this increases the chances of having an obsolete request in the pipeline, which then makes it more likely that an obsolete request will be granted. In accordance with the present invention, to minimize the length of the grant pipeline, each implementation of the round robin is accomplished by using 23 instances of the rotate and select option module 105. Each one of these 23 instances presumes that a specific input buffer 110 won the previous arbitration. As an example, consider the rotate and select option module that assumes that input buffer N−1 won the previous arbitration. The bit 0 position will be hard wired to always contain grant information for input buffer N. So, bit 1 will be wired to show information for input buffer N+1, and so on. When input buffer 22 is reached, bit M will reflect the information for input buffer N+M. If M is less than 22, then bit M+1 will be used for input buffer 0, bit M+2 for input buffer 1, and so on, until all 23 input buffers have been mapped. The arbitration winners in each of these rotate and select option modules is simply the least significant bit with a request. As such, 23 rotate and select option modules 105 are used, each of which will select an option winner based on one particular input buffer assuming to have won the previous round robin. The rotate and select module 115 of the arbiter then selects one of the 23 option winners based on the actual previous round robin arbitration cycle winner. As such, the system and method of the present invention allows all the ordering considerations to be accomplished with wires rather than with logic, thereby minimizing the grant pipeline length.

Additionally, having multiple instances of the rotate and select option modules 105 allows the round robin arbitrations to be performed in parallel, thereby further minimizing the arbitration delay.

In an additional embodiment, the requests from the input ports 75 may be further identified as belonging to a specific priority group. Along with the grant request signal, the input port may also send an associated priority signal. The number of possible priority groups is dependent upon the specific switch implementation and can vary between system implementations as required. Prior to performing round robin selection, the grant requests are grouped by priorities, so that, for example, all priority P grant requests would be considered together. This sorting is performed by the priority request sorting module. After the grant requests are sorted by priority into priority groups using the priority request sorting module 125, each of the grant requests within each of the priority groups requires round robin arbitration. An identical arbitration scheme is then used for each of these arbitrations within each of the priority groups.

In a particular embodiment for a switch having 23 input ports 75, 23 output ports 80 and four priority groups (A-D), each of the requests received from each of the 23 input ports 75 in sorted into one of the four priority groups. In this instance N*P or (23×4) round robins are performed prior to selecting the current round robin arbitration winner. Each of the input buffers is assigned a number from 0 to 22. The priority request sorting module then sorts the 23 requests based on the priority of the request. Assuming there are four priority groups A, B, C and D, the priority A requests are sent to the N priority A round robins, the priority B requests are sent to the N priority B round robins, the priority C requests are sent to the N priority C round robins and the priority D requests are sent to the N priority D round robins. As an example, within group A, consider the rotate and select option module 105 that assumes that input buffer N−1 won the previous arbitration. The bit 0 position will be hard wired to always contain grant information for input buffer N. So, bit 1 will be wired to show information for input buffer N+1, and so on. When input buffer 22 is reached, bit M will reflect the information for input buffer N+M. If M is less than 22, then bit M+1 will be used for input buffer 0, bit M+2 for input buffer 1, and so on, until all five input buffers within group 0 have been mapped. The arbitration winners in each of these rotate and select option modules is simply the least significant bit with a request. As such, 23 rotate and select option modules 105 are used, each of which will select an option winner based on one particular input buffer assuming to have won the previous round robin. The rotate and select module 115 of the arbiter then selects one of the 23 option winners based on the actual previous round robin arbitration cycle winner. Then, when the desired priority is identified, the winner from the desired priority group is selected as the current round robin arbitration winner. As such, the system and method of the present invention allows all the ordering considerations to be accomplished with wires rather than with logic, thereby minimizing the grant pipeline length.

In addition to the embodiments of the invention described with reference to a switch for transferring data packets, other switching networks are within the scope of the present invention, including but not limited to a circuit switch in which a dedicated circuit between the input port and output port is established prior to the transfer of data.

Although specific embodiments of the invention have been disclosed, it will be understood by those having ordinary skill in the art that changes can be made to the specific embodiments without departing from the spirit and scope of the invention. Additionally, many modifications may be made to adapt a particular situation to the teachings of the present invention without departing from the central inventive concepts described herein. Furthermore, an embodiment of the present invention may not include all of the features described above. The scope of the invention is not to be restricted, therefore, to the specific embodiments, and it is intended that the appended claims cover any and all such applications, modifications, and embodiments within the scope of the present invention.

What is claimed is:

1. A method for round robin arbitration in a switch comprising a plurality of input ports and a plurality of output ports, the method comprising the steps of:
    receiving a plurality of requests from N input ports of the switch;
    determining N round robin arbitration option winners by the switch performing N round robin arbitration options on the plurality of requests before an actual previous round robin arbitration winner has been determined, each of the N round robin arbitration options performed without knowing the actual previous round robin arbitration winner and assuming that a different one of the N input ports was the actual previous round robin arbitration winner;
    identifying the input port of the N input ports that was the actual previous round robin arbitration winner; and
    selecting a current round robin arbitration winner from among the N round robin arbitration option winners by selecting the round robin arbitration option winner in which the assumed previous round robin arbitration winner is the actual previous round robin arbitration winner.

2. The method of claim 1, wherein the step of determining N round robin arbitration option winners by performing N round robin arbitration options further comprises performing the N round robin arbitration options substantially simultaneously.

3. The method of claim 1, further comprising the step of identifying each of the plurality of requests as belonging to one of P priority groups prior to the step of determining N round robin arbitration option winners.

4. The method of claim 3, wherein the step of determining N round robin arbitration option winners further comprises, performing N*P round robin arbitration options, wherein N round robin arbitration options are performed within each of the P priority groups recognizing a different P priority group as being a possible desired priority group.

5. The method of claim 4, further comprising the step of selecting P round robin arbitration priority group winners from among the N*P round robin arbitration option winners by selecting the round robin arbitration option winner within each of the P priority groups in which the assumed previous round robin arbitration winner is the actual previous round robin arbitration winner.

6. The method of claim 5, further comprising the step of identifying a desired priority group.

7. The method of claim 6, further comprising the step of selecting the current round robin arbitration winner from the P round robin arbitration priority group winners by selecting the round robin arbitration priority group winner identified by the desired priority group.

8. The method of claim 1, wherein the step of receiving a plurality of requests from N input ports further comprises receiving the plurality of requests as an N bit vector.

9. The method of claim 8, wherein the bit positions of the N bit vector are hard wired to identify one of the N input ports as being the assumed previous round robin arbitration winner for each of the N round robin arbitration options.

10. The method of claim 9, wherein the round robin arbitration option winner for each of the N round robin arbitration options is the input port identified by the least significant bit of the N bit vector having a request.

11. The method of claim 1, further comprising issuing a grant to the current round robin arbitration winner.

12. A switch comprising an arbiter configured to receive a plurality of requests from N input ports, the arbiter further comprising:
    N rotate and select option modules of the switch configured to determine N round robin arbitration option winners by performing N round robin arbitration options on the plurality of requests before an actual previous round robin arbitration winner has been determined, each of the N round robin arbitration options performed without knowing the actual previous round robin arbitration winner and assuming that a different one of the N input ports was the actual previous round robin arbitration winner;
    logic to identify the input port of the N input ports that was the actual previous round robin arbitration winner; and
    a rotate and select module configured to the rotate and select option modules to select a current round robin arbitration winner from among the N round robin arbitration option winners by selecting the round robin arbitration option winner in which the assumed previous round robin arbitration winner is the actual previous round robin arbitration winner.

13. The arbiter of claim 12, wherein the N rotate and select modules perform the N round robin arbitration options substantially simultaneously.

14. The arbiter of claim 12, further comprising a priority module to identify each of the plurality of requests as belonging to one of P priority groups.

15. The arbiter of claim 14, further comprising N*P rotate and select option modules to determine N*P round robin arbitration options, wherein N round robin arbitration options are performed within each of the P priority groups recognizing a different P priority group of requests as being a possible desired priority group.

16. The arbiter of claim 15, further comprising P rotate and select modules coupled to the N*P rotate and select option modules to select P round robin arbitration priority group winners from among the N*P round robin arbitration option winners by selecting the round robin arbitration option winner within each of the P priority groups in which the assumed previous round robin arbitration winner is the actual previous round robin arbitration winner.

17. The arbiter of claim 16, further comprising logic to identifying a desired priority group.

18. The arbiter of claim 17, further comprising a rotate and select priority module to select the current round robin arbitration winner from the P round robin arbitration priority group winners by selecting the round robin arbitration priority group winner identified by the desired priority group.

19. The arbiter of claim 12, wherein the plurality of requests received from the N input ports are an N bit vector.

20. The arbiter of claim 19, wherein the bit positions of the N bit vector are hard wired to identify one of the N input ports as being the assumed previous round robin arbitration winner for each of the N round robin arbitration options.

21. The arbiter of claim 20, wherein the round robin arbitration option winner for each of the N round robin arbitration options is the input port identified by the least significant bit of the N bit vector having a request.

22. A method for round robin arbitration in a switch comprising a plurality of input ports and a plurality of output ports, the method comprising the steps of:
- receiving a plurality of requests from N input ports of the switch;
- identifying each of the plurality of requests as belonging to one of P priority groups;
- determining P round robin arbitration priority group winners by the switch performing a round robin arbitration among the requests identified to belong in each of the P priority groups before a desired priority group has been determined, the round robin arbitration performed without knowing the desired priority group;
- identifying the desired priority group; and
- selecting the current round robin arbitration winner from the P round robin arbitration priority group winners by selecting the round robin arbitration priority group winner identified by the desired priority group.

23. The method of claim 22, wherein the step of determining P round robin arbitration priority group winners by performing a round robin arbitration among the requests identified to belong in each of the P priority groups, further comprises:
- performing N*P round robin arbitration options before an actual previous round robin arbitration winner has been determined, wherein N round robin arbitration options are performed within each of the P priority groups recognizing a different P priority group as being a possible desired priority group, and wherein the N round robin arbitration options within each of the P priority groups are performed without knowing the actual previous round robin arbitration winner and assuming that a different one of the N input ports was the actual previous round robin arbitration winner;
- identifying the input port of the N input ports that was the actual previous round robin arbitration winner; and
- determining P round robin arbitration priority group winners from among the N*P round robin arbitration options winners by selecting the round robin arbitration option winner within each of the P priority groups in which the assumed previous round robin arbitration winner is the actual previous round robin arbitration winner.

24. The method of claim 23, wherein the plurality of requests form an N bit vector.

25. The method of claim 24, wherein the bit positions of the N bit vector are hard wired to identify one of the N input ports as being the assumed previous round robin arbitration winner.

26. The method of claim 25, wherein the round robin arbitration option winner for each of the N round robin arbitration options is the input port identified by the least significant bit on the N bit vector having a request.

27. The method of claim 22, further comprising issuing a grant to the current round robin arbitration winner.

28. A switch comprising an arbiter configured to receive a plurality of requests from N input ports, the arbiter further comprising:
- a priority module to identify each of the plurality of requests as belonging to one of P priority groups;
- P rotate and select modules of the switch to determine P round robin arbitration priority group winners by performing a round robin arbitration among the requests identified to belong in each of the P priority groups before a desired priority group has been determined, the round robin arbitration performed without knowing the desired priority group;
- logic to identifying the desired priority group; and
- a rotate and select priority module to select the current round robin arbitration winner from the P round robin arbitration priority group winners by selecting the round robin arbitration priority group winner identified by the desired priority group.

29. The arbiter of claim 28, further comprising:
- logic to identify a previous round robin arbitration winner;
- N*P rotate and select modules, wherein N round robin arbitration options are performed within each of the P priority groups before an actual previous round robin arbitration winner has been determined and recognizing a different P priority group as being a possible desired priority group, and wherein the N round robin arbitration options within each of the P priority groups are performed without knowing the actual previous round robin arbitration winner and assuming that a different one of the N input ports was the previous round robin arbitration winner;
- logic to identifying the input port of the N input ports that was the actual previous round robin arbitration winner; and
- a rotate and select priority module to determine P round robin arbitration priority group winners from among the N*P round robin arbitration options winners by selecting the round robin arbitration option winner within each of the P priority groups in which the assumed previous round robin arbitration winner is the actual previous round robin arbitration winner.

30. The arbiter of claim 28, wherein the plurality of requests form an N bit vector.

31. The arbiter of claim 30, wherein the bit positions of the N bit vector are hard wired to identify one of the N input ports as being the assumed previous round robin arbitration winner.

32. The arbiter of claim 31, wherein the round robin arbitration option winner for each of the N round robin arbitration options is the input port identified by the least significant bit on the N bit vector having a request.

* * * * *